(12) United States Patent
Tominaga

(10) Patent No.: US 11,001,126 B2
(45) Date of Patent: May 11, 2021

(54) VEHICLE AIR-CONDITIONING UNIT

(71) Applicant: DENSO CORPORATION, Kariya (JP)

(72) Inventor: Masahiro Tominaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 16/085,605

(22) PCT Filed: Feb. 2, 2017

(86) PCT No.: PCT/JP2017/003783
§ 371 (c)(1),
(2) Date: Sep. 17, 2018

(87) PCT Pub. No.: WO2017/163620
PCT Pub. Date: Sep. 28, 2017

(65) Prior Publication Data
US 2019/0084371 A1    Mar. 21, 2019

(30) Foreign Application Priority Data

Mar. 22, 2016    (JP) .............................. JP2016-057496

(51) Int. Cl.
*B60H 1/00*    (2006.01)
*B60H 1/32*    (2006.01)

(52) U.S. Cl.
CPC ..... *B60H 1/00528* (2013.01); *B60H 1/00535* (2013.01); *B60H 1/00542* (2013.01); *B60H 1/00571* (2013.01); *B60H 2001/00635* (2013.01)

(58) Field of Classification Search
CPC ............ B60H 1/00528; B60H 1/00571; B60H 1/00535; B60H 1/00542; B60H 2001/00635

USPC ............................................................ 62/285
See application file for complete search history.

(56) References Cited

U.S. PATENT DOCUMENTS

| | | | | |
|---|---|---|---|---|
| 3,404,540 A | * | 10/1968 | Bryans | .................... F24F 13/22 |
| | | | | 62/285 |
| 6,351,962 B1 | * | 3/2002 | Mizutani | ............ B60H 1/00528 |
| | | | | 180/90 |
| 7,377,554 B2 | * | 5/2008 | Motomura | ........... B60H 1/3229 |
| | | | | 165/41 |

(Continued)

FOREIGN PATENT DOCUMENTS

| | | |
|---|---|---|
| JP | H11180135 A | 7/1999 |
| JP | 2008105641 A | 5/2008 |

(Continued)

*Primary Examiner* — Ljiljana V. Ciric
*Assistant Examiner* — Kirstin U Oswald
(74) *Attorney, Agent, or Firm* — Harness, Dickey & Pierce, P.L.C.

(57) ABSTRACT

A vehicle air-conditioning unit includes a seal compressing portion presses a sealing component against a partition wall that separates an interior and an exterior of a vehicle compartment. The seal compressing portion is positioned in the interior of the vehicle compartment and includes a tubing routing space through which inner tubing extends, and a drain space positioned below the tubing routing space to receive water drained from the tubing routing space. The drain space communicates with the exterior of the vehicle compartment via a through hole of the partition wall to discharge water from the drain space to the exterior of the vehicle compartment.

8 Claims, 10 Drawing Sheets

(56) References Cited

U.S. PATENT DOCUMENTS

| | | | | |
|---|---|---|---|---|
| 7,665,323 B2* | 2/2010 | Toba | ................... | B60H 1/00528 |
| | | | | 62/288 |
| 9,568,128 B2* | 2/2017 | Okada | ................... | F16L 23/003 |
| 2002/0056283 A1* | 5/2002 | Kim | ................... | F24F 13/20 |
| | | | | 62/285 |
| 2004/0069480 A1* | 4/2004 | Yamamoto | ......... | B60H 1/00028 |
| | | | | 165/202 |
| 2004/0083747 A1* | 5/2004 | Shichiken | .......... | B60H 1/00514 |
| | | | | 62/244 |
| 2005/0230967 A1* | 10/2005 | Motomura | .............. | F16L 23/02 |
| | | | | 285/10 |
| 2005/0248173 A1* | 11/2005 | Bejin | ................... | B60R 5/04 |
| | | | | 296/37.1 |
| 2007/0144208 A1* | 6/2007 | Araki | .................... | F25D 23/006 |
| | | | | 62/527 |
| 2012/0199661 A1* | 8/2012 | Hara | ................... | B60H 1/00528 |
| | | | | 236/92 B |
| 2015/0300544 A1* | 10/2015 | Okada | ................... | F16L 41/086 |
| | | | | 285/403 |
| 2015/0328957 A1* | 11/2015 | Baek | ................. | B60H 1/00514 |
| | | | | 62/515 |
| 2016/0325604 A1* | 11/2016 | Jeong | ................. | B60H 1/00514 |

FOREIGN PATENT DOCUMENTS

| | | | | |
|---|---|---|---|---|
| JP | 2011201391 A | | 10/2011 | |
| JP | 2014061791 A | | 4/2014 | |
| WO | WO-2013190803 A1 * | 12/2013 | .............. | F16L 19/00 |

* cited by examiner

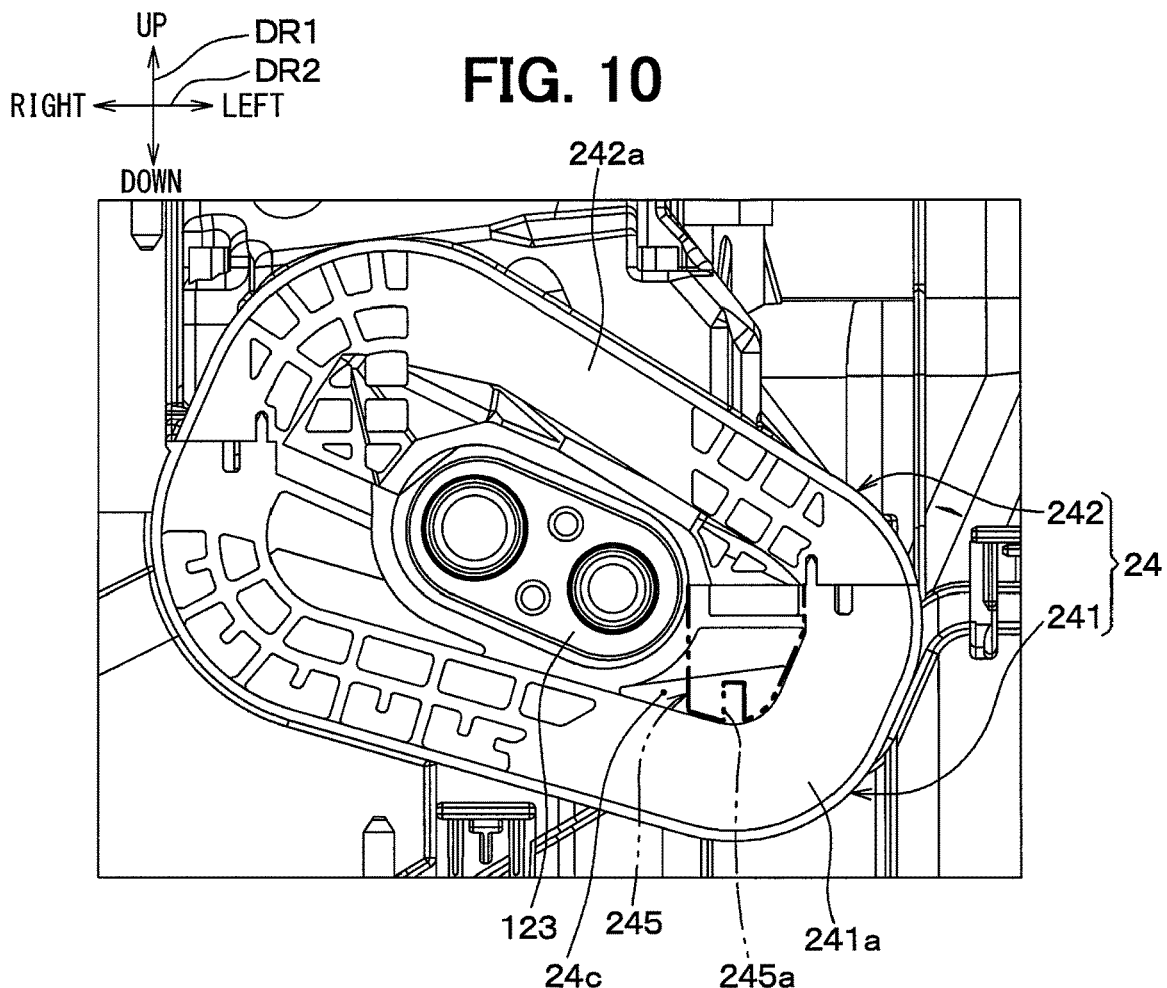
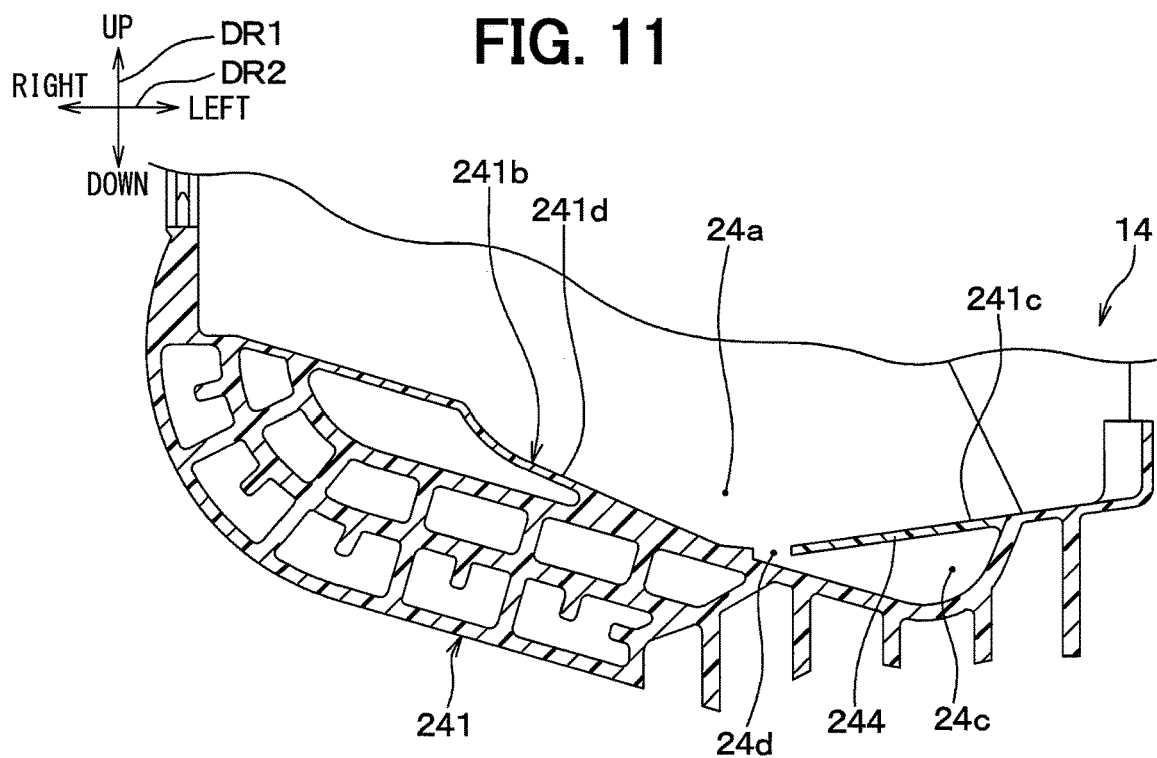

VEHICLE AIR-CONDITIONING UNIT

CROSS REFERENCE TO RELATED APPLICATIONS

This application is a U.S. National Phase Application under 35 U.S.C. 371 of International Application No. PCT/JP2017/003783 filed on Feb. 2, 2017. This application is based on and claims the benefit of priority from Japanese Patent Application No. 2016-057496 filed on Mar. 22, 2016. The entire disclosures of all of the above applications are incorporated herein by reference.

TECHNICAL FIELD

The present disclosure relates to a vehicle air-conditioning unit that conditions air for an interior of a vehicle compartment.

BACKGROUND ART

As this type of vehicle air-conditioning unit, a conventional air-conditioning unit described in, for example, Patent Literature 1 is known. The air-conditioning unit described in Patent Literature 1 is placed on a side of a dash panel facing an interior of a vehicle compartment while the dash panel is a partition wall that separates the interior of the vehicle compartment from an engine room that is an exterior of the vehicle compartment.

The air-conditioning unit in Patent Literature 1 includes a casing that accommodates a heat exchanger and the like. The casing has a front wall portion facing the dash panel. A tubing support portion is disposed on the front wall portion to support refrigerant tubing inside the compartment. The air-conditioning unit in Patent Literature 1 includes a dash sealing material between the tubing support portion and the dash panel.

The dash sealing material is formed so as to surround the refrigerant tubing in the interior of the compartment. The dash sealing material is interposed between and compressed by the tubing support portion and a hole peripheral portion located around a through hole formed in the dash panel. The tubing support portion thus serves as a seal compressing portion that compresses the dash sealing material. The dash sealing material is in pressing contact with the tubing support portion and the hole peripheral portion of the dash panel, thereby maintaining a seal between the tubing support portion and the hole peripheral portion.

PRIOR ART LITERATURE

Patent Literature

Patent Literature 1: JP 2014-061791 A

SUMMARY

Common vehicle air-conditioning units such as the air-conditioning unit in Patent Literature 1 described above need a through hole in the dash panel, which is a partition wall, to couple the refrigerant tubing in the interior of the compartment to refrigerant tubing in the exterior of the compartment. The dash sealing material or the like is used as a waterproofing measure to prevent water from entering the interior of the vehicle compartment from the exterior of the vehicle compartment through the through hole.

It is, however, difficult to completely block the entry of water into the interior of the vehicle compartment from the exterior of the vehicle compartment with the waterproofing measure using the dash sealing material or the like. For example, when the engine room is high-pressure-washed, water may enter a tubing routing space through the through hole of the partition wall. The tubing routing space is provided in the seal compressing portion of the vehicle air-conditioning unit to route the refrigerant tubing inside the compartment through the tubing routing space. When the intrusion of water into the tubing routing space increases in amount to a certain degree, the water may leak from the vehicle air-conditioning unit in the interior of the vehicle compartment. The inventor has conducted a detailed study to find the foregoing.

In view of the above, an object of the present disclosure is to provide a vehicle air-conditioning unit capable of securing a drain path thorough which water is discharged from a tubing routing space in a seal compressing portion to an exterior of a vehicle compartment and capable of preventing water from flowing backward into the tubing routing space through the drain path.

In order to achieve the above-described object, a vehicle air-conditioning unit according to an aspect of the present disclosure is to be placed on a side of a partition wall that faces an interior of a vehicle compartment. The partition wall separates the interior and an exterior of the vehicle compartment in a vehicle, and has a through hole. The vehicle air-conditioning unit includes: a tubing coupler configured to be a part of a tubing module extending through the through hole, the tubing coupler being configured to be coupled to tubing, the tubing being included in the tubing module and located in the exterior of the vehicle compartment; inner tubing configured to be included in the tubing module and configured to be coupled via the tubing coupler to the tubing located in the exterior of the vehicle compartment; a sealing component surrounding the tubing coupler; and a seal compressing portion configured to be disposed to face a through-hole surrounding portion across the sealing component, the through-hole surrounding portion constituting a periphery of the through hole of the partition wall, the sealing component being configured to be compressed between the seal compressing portion and the through-hole surrounding portion. The seal compressing portion includes a tubing routing space configured to allow the inner tubing to extend therethrough, and a drain space positioned below the tubing routing space and configured to receive water drained from the tubing routing space. The drain space is configured to communicate with the exterior of the vehicle compartment via the through hole in such a manner that water is discharged from the drain space to the exterior of the vehicle compartment.

As described above, the drain space of the seal compressing portion receives water drained from the tubing routing space and communicates with the exterior of the vehicle compartment via the through hole of the partition wall in such a manner that water is drained from the drain space to the exterior of the vehicle compartment. The drain path that drains water from the tubing routing space of the seal compressing portion to the exterior of the vehicle compartment can thus be provided. Additionally, the drain space of the seal compressing portion is disposed below the tubing routing space; thus, water is not likely to flow from the drain space to the tubing routing space. Water can be thus prevented from flowing backward into the tubing routing space through the drain path.

BRIEF DESCRIPTION OF THE DRAWINGS

FIG. 10 is a detail diagram of a seal compressing portion and a nearby area in a second embodiment with a sealing component and an expansion valve omitted; this diagram is equivalent to FIG. 3 in the first embodiment.

FIG. 11 is a sectional view taken along line VII-VII in FIG. 4, illustrating an air-conditioning case according to a third embodiment in an unassembled state; this diagram is equivalent to FIG. 7 in the first embodiment.

DESCRIPTION OF EMBODIMENTS

Figure 12:
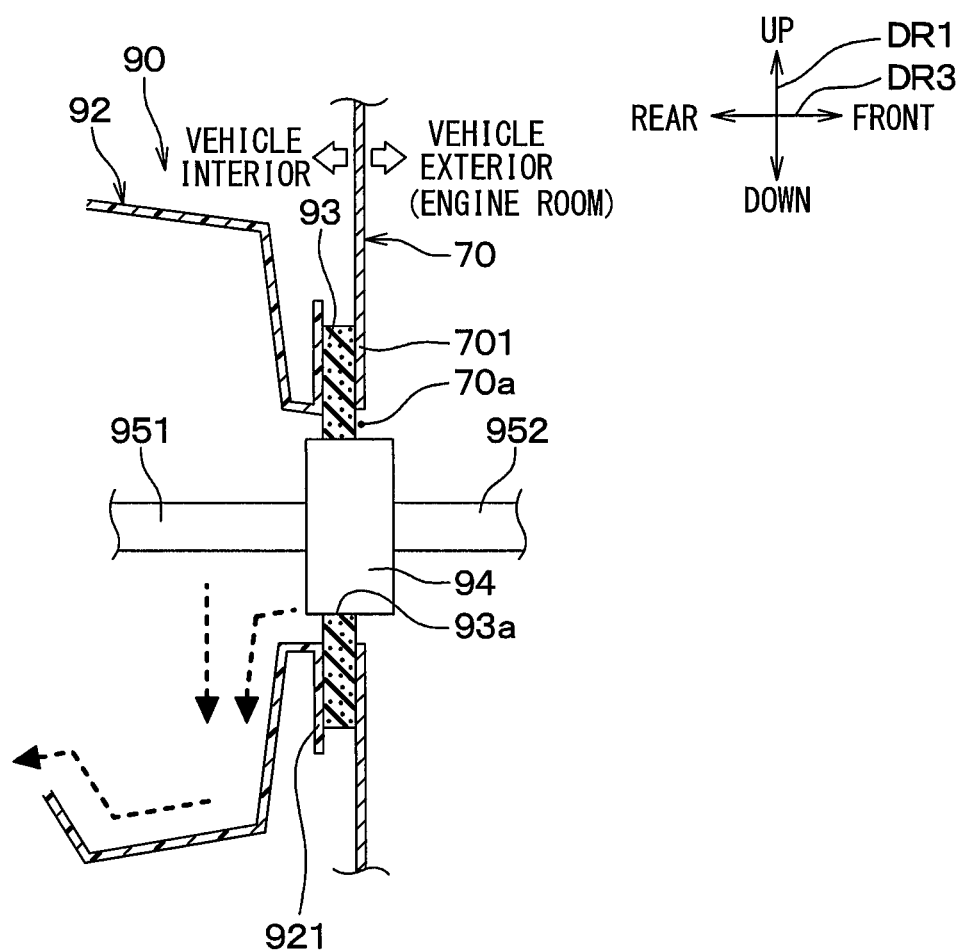
FIG. 12 is a schematic sectional view of a structure, near a dash panel, of a conventional vehicle air-conditioning unit for use in a vehicle.

A conventional vehicle air-conditioning unit 90 is described first below to provide a basis for describing some embodiments. FIG. 12 is a schematic sectional view of a structure, near a dash panel 70, of the conventional vehicle air-conditioning unit 90 for use in a vehicle. As illustrated in FIG. 12, the vehicle air-conditioning unit 90 is placed on an interior of a vehicle compartment side of the dash panel 70. The dash panel 70 is a partition wall that separates the interior of the vehicle compartment from an engine room, which is an exterior of the vehicle compartment, and is made by using a steel plate or the like. The dash panel 70 configures, for example, a portion of a vehicle body. The dash panel 70 has a through hole 70a and a through-hole surrounding portion 701 that configures the periphery of the through hole 70a.

The conventional vehicle air-conditioning unit 90 includes an air-conditioning case 92, a sealing component 93 made by using urethane foam or the like, and an expansion valve 94. The expansion valve 94 is a valve mechanism that reduces pressure of a refrigerant to allow the refrigerant to expand. The expansion valve 94 also joins inner tubing 951, which is refrigerant tubing located inside the air-conditioning case 92, to tubing 952 located in the exterior of the vehicle compartment.

The air-conditioning case 92 has a seal compressing portion 921 that presses the sealing component 93 against the through-hole surrounding portion 701 of the dash panel 70 so as to compress the sealing component 93. The dash panel 70 and the seal compressing portion 921 are thus joined in a waterproof manner.

The seal compressing portion 921 and the sealing component 93 are formed so as to surround the expansion valve 94. For example, a press-in hole 93a shaped to fit a contour of the expansion valve 94 is formed in the sealing component 93. The expansion valve 94 is pressed into the press-in hole 93a of the sealing component 93. The expansion valve 94 and the sealing component 93 are thus joined together in a waterproof manner.

In the vehicle air-conditioning unit 90, for which such waterproofing measures as described above are taken, water may enter the inside of the seal compressing portion 921 through the through hole 70a of the dash panel 70 as indicated by, for example, broken line arrows in FIG. 12 due to reasons such as insufficient waterproof capacity of the sealing component 93. Additionally, no special structure is provided to drain water that has entered the inside of the seal compressing portion 921 to the exterior of the vehicle compartment. When the entry of water (that is, the intrusion of water) increases in amount to a certain degree, the water may leak from the air-conditioning case 92 of the vehicle air-conditioning unit 90 in the interior of the vehicle compartment.

A vehicle air-conditioning unit 10 in some embodiments described below is configured to avoid such water leaks from the air-conditioning case 92 as described above.

Some embodiments are described below with reference to the drawings. In the following embodiments, identical or equivalent portions are designated with identical symbols in the drawings.

First Embodiment

Figure 1:
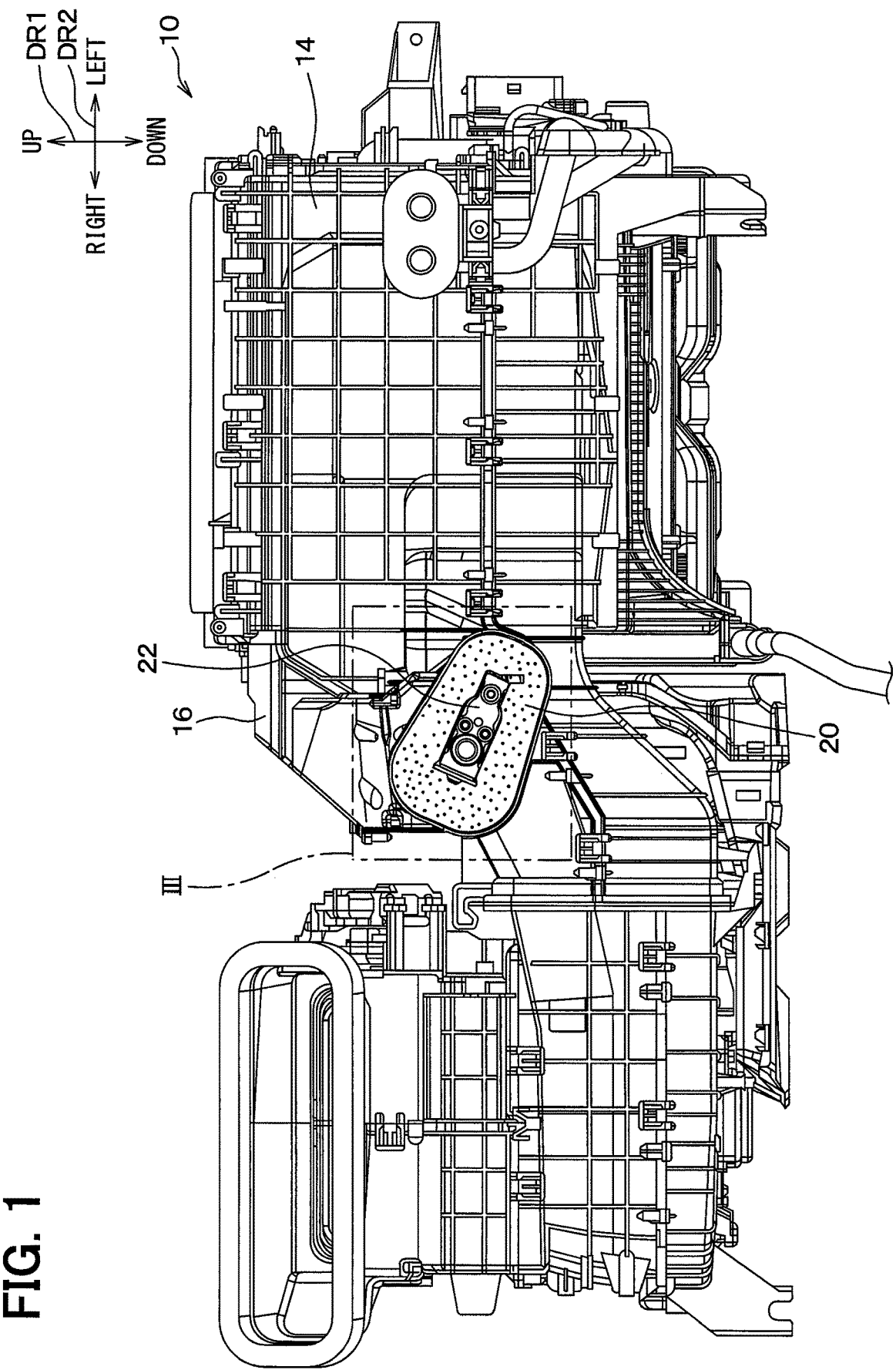
FIG. 1 is an overall view of a vehicle air-conditioning unit according to a first embodiment.

FIG. 1 is an overall view of a vehicle air-conditioning unit 10 according to the present embodiment. FIG. 1 illustrates an external view of the vehicle air-conditioning unit 10 observed from the front of a vehicle. The vehicle air-conditioning unit 10 is an air-conditioning unit placeable on an interior of a vehicle compartment side of a dash panel 70 (see FIG. 12). Specifically, the vehicle air-conditioning unit 10 according to the present embodiment is placed toward the rear of the vehicle with respect to the dash panel 70, as in the case with the vehicle air-conditioning unit 90 in FIG. 12. The vehicle air-conditioning unit 10, together with a compressor, a condenser, and the like that are placed in an exterior of the vehicle compartment (for example, in an engine room), configures a vehicle air-conditioning apparatus.

Arrows DR1 and DR2 in FIG. 1 and an arrow DR3 in FIG. 12 represent directions with respect to the vehicle in which the vehicle air-conditioning unit 10 is mounted. Specifically, in FIG. 1, the arrow DR1 represents a vehicle up and down direction DR1, and the arrow DR2 represents a vehicle width direction DR2 (that is, a vehicle right and left direction DR2). In FIG. 12, the arrow DR3 represents a vehicle front and rear direction DR3.

Figure 2:
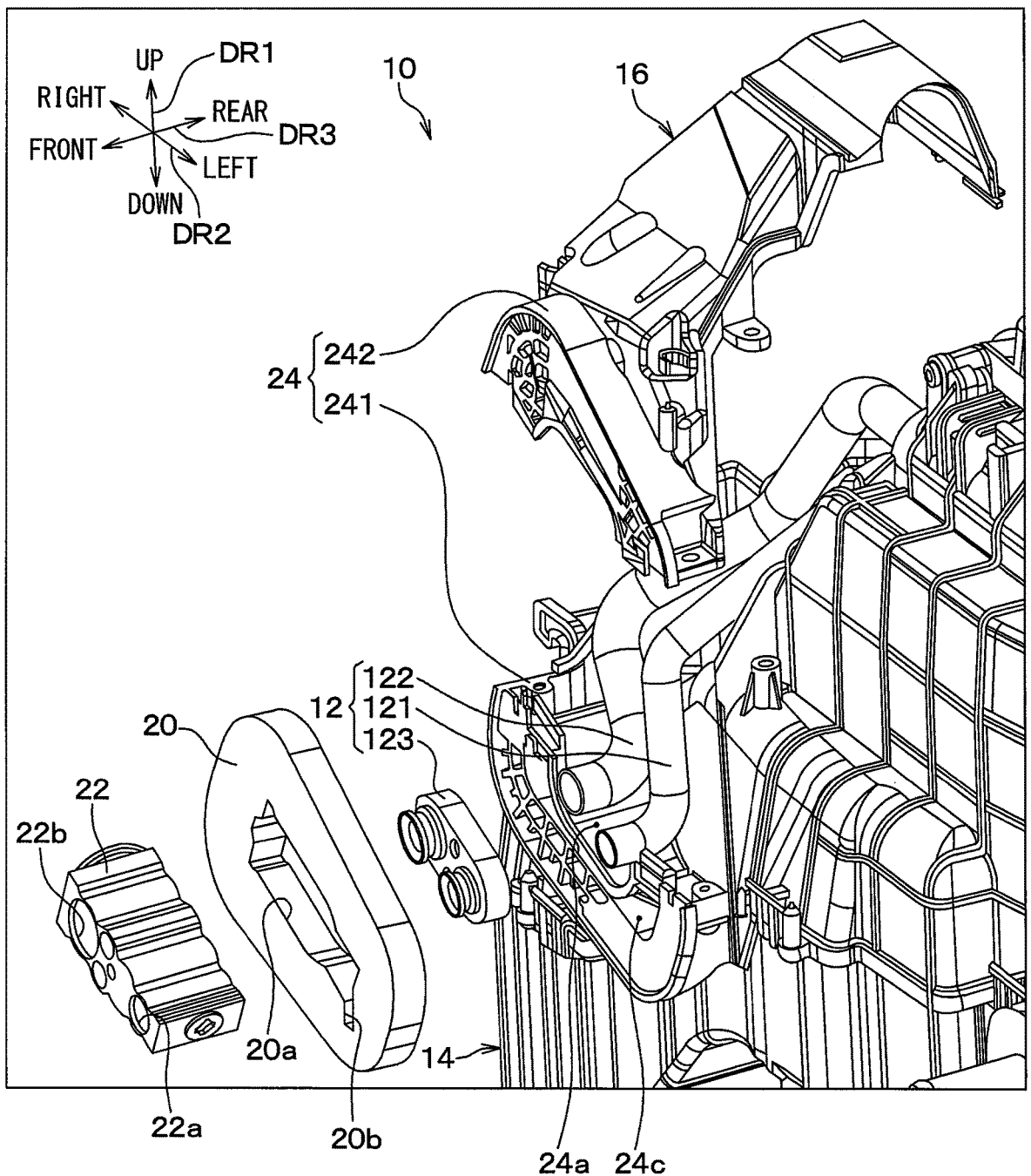
FIG. 2 is an exploded perspective view, together with nearby components, of inner tubing coupled to an evaporator of the vehicle air-conditioning unit according to the first embodiment.

FIG. 2 is an exploded perspective view, together with nearby components, of inner tubing 12 coupled to an evaporator (not shown) of the vehicle air-conditioning unit 10. As illustrated in FIGS. 1 and 2, the vehicle air-conditioning unit 10 includes the inner tubing 12, an air-conditioning case 14, a tubing cover 16, a sealing component 20, and an expansion valve 22.

The air-conditioning case 14 is configured by joining together a plurality of case members that are resin moldings, using screws, claws, and the like. The air-conditioning case 14 is a housing of the vehicle air-conditioning unit 10 that accommodates air conditioner components, such as the evaporator and a heater core (not shown). An air passageway to guide conditioned air into the interior of the vehicle compartment is also formed inside the air-conditioning case 14.

The inner tubing 12 is refrigerant tubing in which a refrigerant flows. The inner tubing 12 couples the expansion valve 22 and the evaporator together. Specifically, the inner tubing 12 includes an inlet tube 121, an outlet tube 122, and a tube connector 123. The refrigerant flows into the evaporator through the inlet tube 121 and flows out from the evaporator through the outlet tube 122. The tube connector 123 is disposed between the inlet tube 121 and the expansion valve 22 and between the outlet tube 122 and the expansion valve 22. The inlet tube 121 and the outlet tube 122 each are coupled to the expansion valve 22 via the tube connector 123.

The tubing cover 16 is a cover that covers an upper portion of the inner tubing 12. A portion of the air-conditioning case 14 covers a lower portion of the inner tubing 12. The tubing cover 16 is made by using resin and secured to the air-conditioning case 14 by using screws, claws, and the like.

The expansion valve 22 configures a portion of a refrigerating cycle that includes the evaporator, the compressor, and the condenser (not shown). The expansion valve 22 is a valve mechanism that reduces pressure of the refrigerant, which circulates in the refrigerating cycle, to allow the refrigerant to expand. The expansion valve 22 has, for example, a block-like shape and also serves as a tubing coupler that is coupled to tubing 952 located in the exterior of the vehicle compartment (see FIG. 12). The tubing 952 located in the exterior of the vehicle compartment includes two refrigerant tubes, one of which is coupled to a refrigerant inlet port 22a of the expansion valve 22 and the other one of which is coupled to a refrigerant outlet port 22b of the expansion valve 22.

The inner tubing 12 is thus coupled to the tubing 952 located in the exterior of the vehicle compartment via the expansion valve 22 in the vehicle air-conditioning unit 10. Specifically, the tubing 952 located in the exterior of the vehicle compartment is coupled to the expansion valve 22 toward the front of the vehicle with respect to the expansion valve 22; the inner tubing 12 is coupled to the expansion valve 22 toward the rear of the vehicle with respect to the expansion valve 22. In other words, the inner tubing 12 and the tubing 952 located in the exterior of the vehicle compartment are coupled to the expansion valve 22 on opposite sides of the expansion valve 22.

The inner tubing 12, the expansion valve 22, and the tubing 952 located in the exterior of the vehicle compartment configure a tubing module. The tubing module is routed from inside the vehicle air-conditioning unit 10 through the through hole 70a of the dash panel 70 to reach the exterior of the vehicle compartment.

The sealing component 20 is made by using a material such as urethane foam or rubber and prevents water from entering the interior of the vehicle compartment through the through hole 70a of the dash panel 70. The sealing component 20 is formed so as to surround the expansion valve 22. Specifically, a press-in hole 20a shaped to fit a contour of the expansion valve 22 is formed in the sealing component 20. The expansion valve 22 is pressed into the press-in hole 20a of the sealing component 20. The expansion valve 22 and the sealing component 20 are thus joined together in a waterproof manner.

Figure 3:
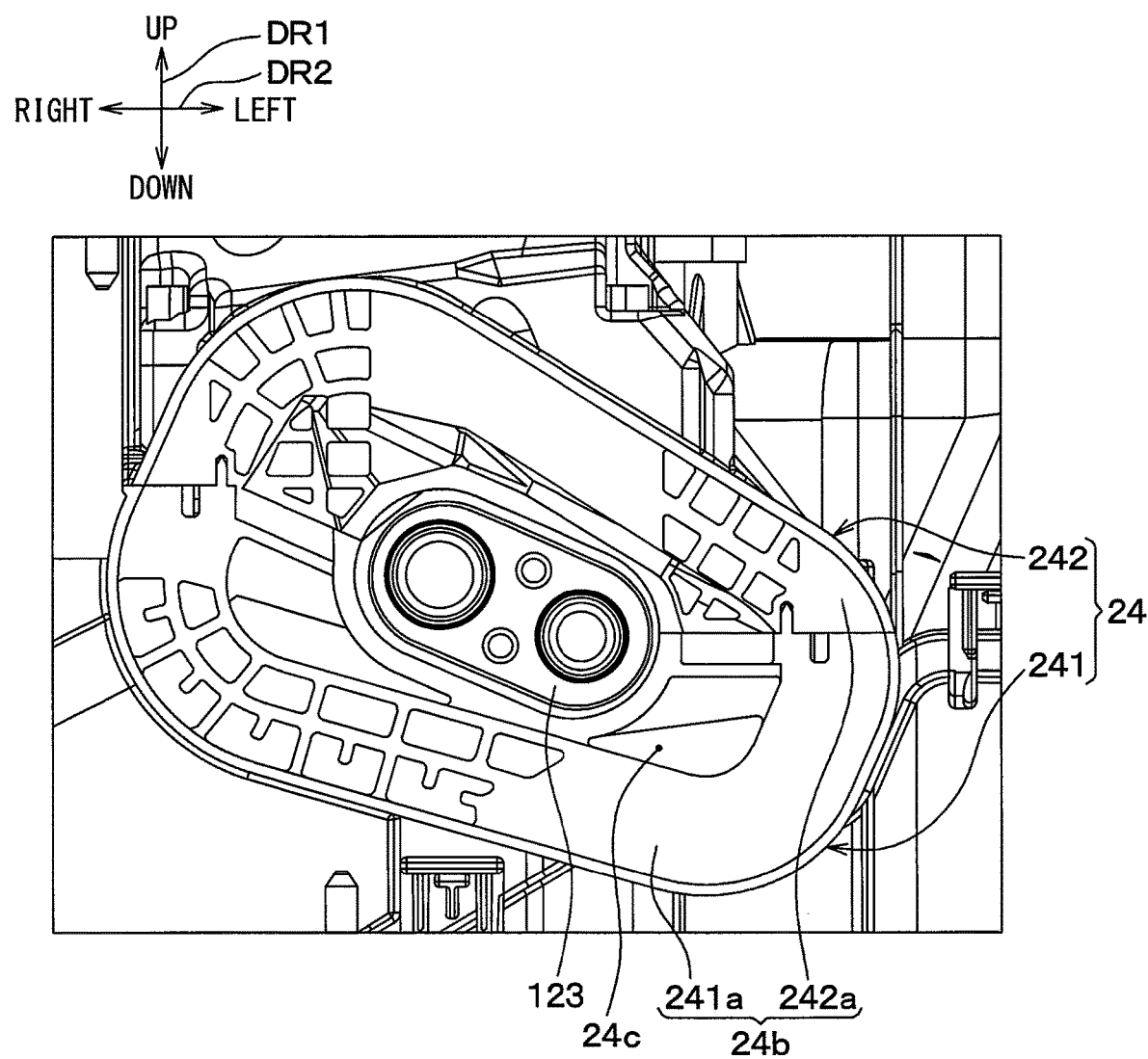
FIG. 3 is an enlarged detail diagram of an area marked with III in FIG. 1, with a sealing component and an expansion valve omitted.
Figure 4:
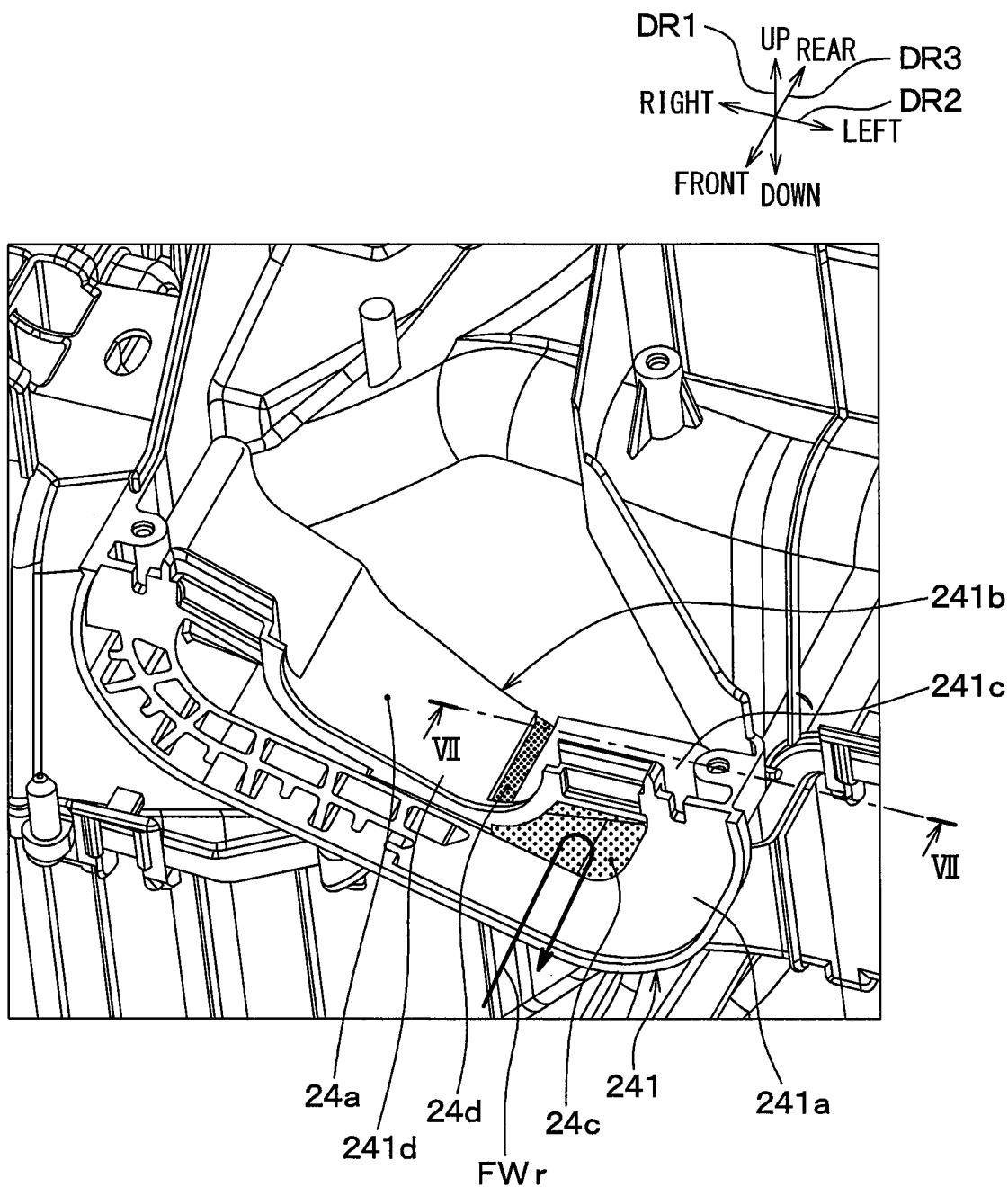
FIG. 4 is a perspective view of an air-conditioning case of the vehicle air-conditioning unit according to the first embodiment in an unassembled state; it is an enlarged view of a lower compressing portion of a seal compressing portion and a nearby area.

As illustrated in FIGS. 2 and 3, the vehicle air-conditioning unit 10 includes a seal compressing portion 24 having a tubular shape extending toward the dash panel 70 (that is, toward the front of the vehicle) in the vehicle front and rear direction DR3. The seal compressing portion 24 has a lower compressing portion 241 and an upper compressing portion 242. The lower compressing portion 241 is included in the air-conditioning case 14; the upper compressing portion 242 is included in the tubing cover 16. The lower compressing portion 241 is disposed below the upper compressing portion 242. As illustrated in FIGS. 2 to 4, a tubing routing space 24a is formed in the seal compressing portion 24 having the tubular shape. The inlet tube 121 and the outlet tube 122 pass through the tubing routing space 24a.

The sealing component 20 is secured by affixing the sealing component 20 to the seal compressing portion 24. The lower compressing portion 241 has a seal affixing surface 241a facing the sealing component 20 toward the front of the vehicle; similarly, the upper compressing portion 242 has a seal affixing surface 242a facing the sealing component 20 toward the front of the vehicle. The seal affixing surface 241a of the lower compressing portion 241 and the seal affixing surface 242a of the upper compressing portion 242 together configure a seal affixing surface 24b of the seal compressing portion 24.

The seal compressing portion 24 and the through-hole surrounding portion 701 of the dash panel 70 are disposed on opposite sides of the sealing component 20. Specifically, the seal compressing portion 24 is disposed toward the rear of the vehicle with respect to the sealing component 20; the through-hole surrounding portion 701 is disposed toward the front of the vehicle with respect to the sealing component 20. The seal compressing portion 24 presses the sealing component 20 against the through-hole surrounding portion 701 so as to compress the sealing component 20. That is, a thickness direction of the sealing component 20 is in the vehicle front and rear direction DR3; the sealing component 20 is compressed by the seal compressing portion 24 and the through-hole surrounding portion 701 in the vehicle front and rear direction DR3.

Assembly of the inner tubing 12, the expansion valve 22, and nearby portions illustrated in FIG. 2 is described below as an example. First, the inner tubing 12 is installed on the air-conditioning case 14. Here, the inner tubing 12 is pre-assembled to the evaporator with the inlet tube 121 and the outlet tube 122 brazed to the tube connector 123. The tubing cover 16 is then joined to the air-conditioning case 14 in such a manner that the tubing cover 16 covers the inner tubing 12 installed on the air-conditioning case 14 from above.

Figure 5:
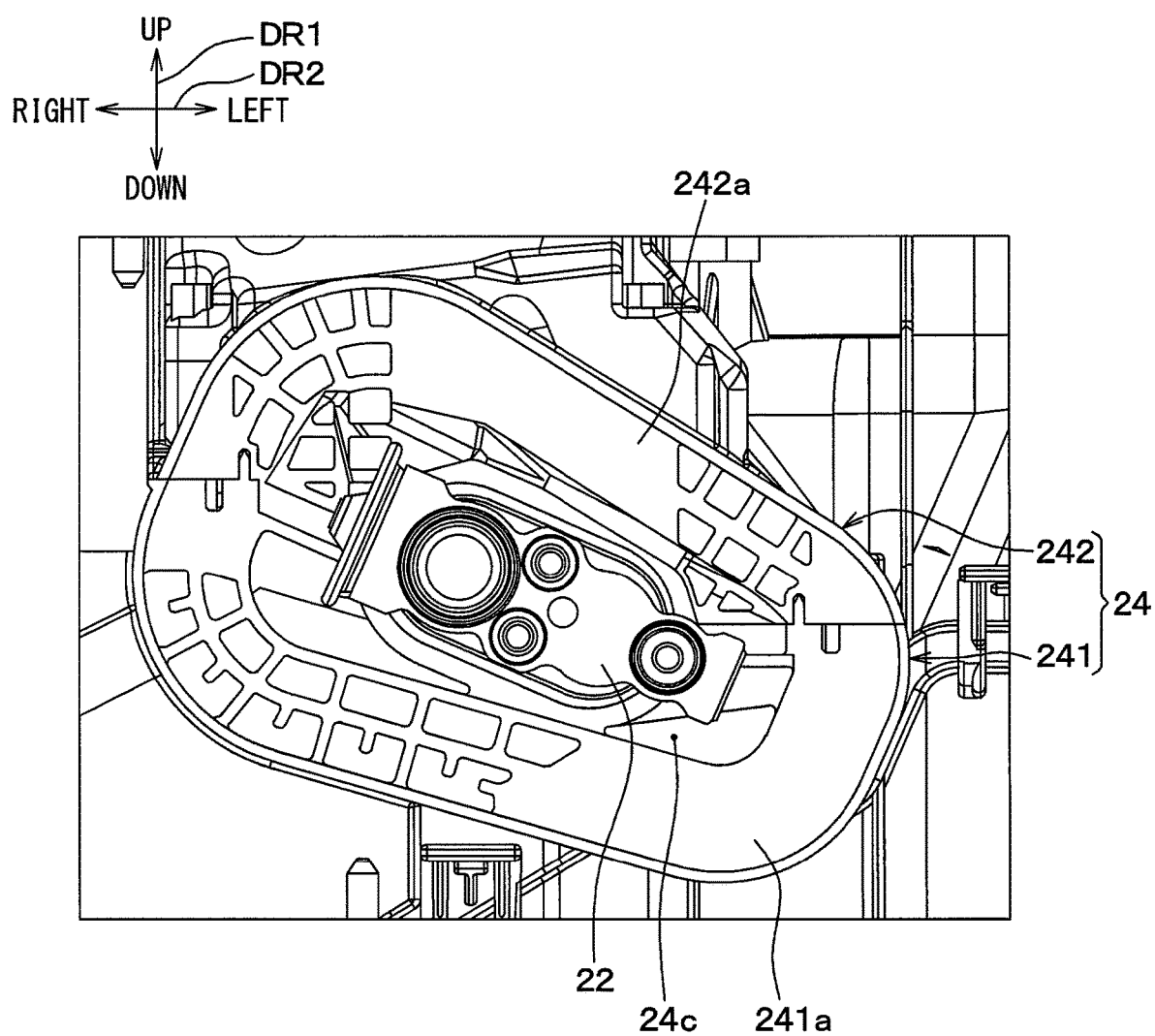
FIG. 5 is an enlarged detail diagram of the area marked with III in FIG. 1, with the expansion valve included and the sealing component omitted.
Figure 6:
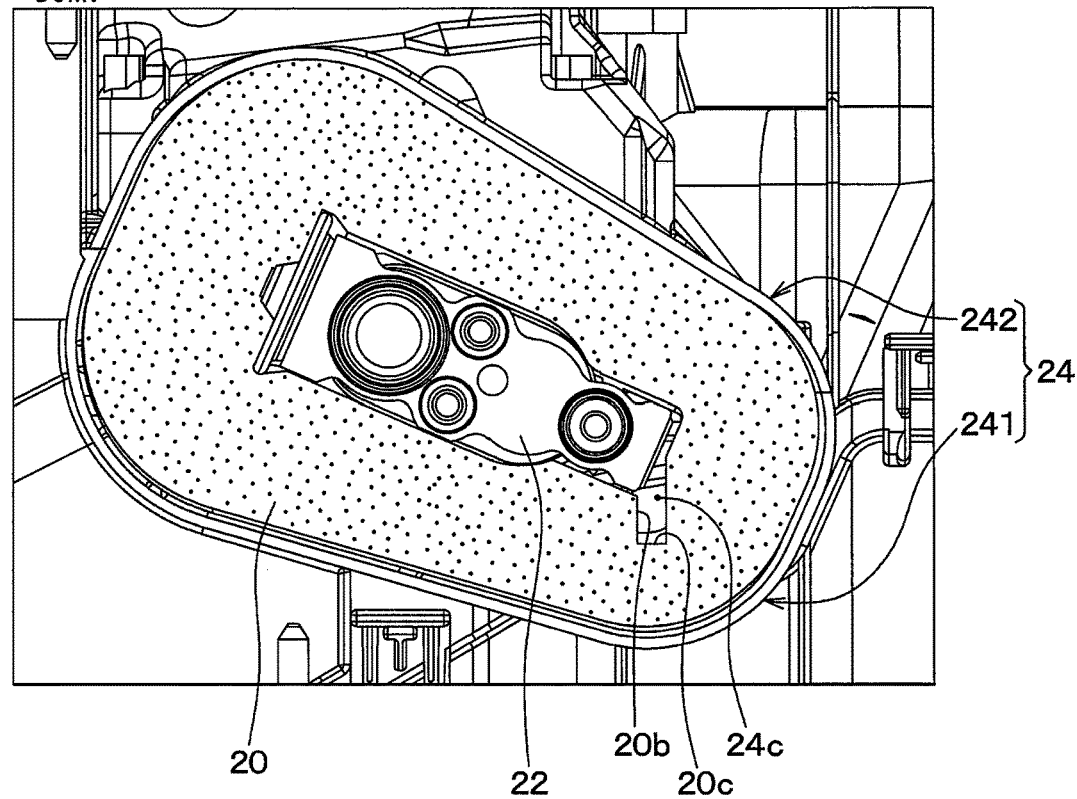
FIG. 6 is an enlarged detail diagram of the area marked with III in FIG. 1, with the sealing component and the expansion valve included.

The expansion valve 22 is then coupled to the tube connector 123. The expansion valve 22 is thus disposed as illustrated in FIG. 5. Then, the expansion valve 22 is pressed into the press-in hole 20a in the sealing component 20, and the sealing component 20 is affixed to the seal affixing surface 24b (see FIG. 3) of the seal compressing portion 24. When the sealing component 20 has been affixed, the sealing component 20 is disposed as illustrated in FIG. 6. The inner tubing 12, the expansion valve 22, and nearby portions are assembled using the procedure as described above.

As illustrated in FIGS. 3 and 4, a drain space 24c and a drain passageway 24d are formed in the lower compressing portion 241 of the seal compressing portion 24. The drain space 24c is disposed below the tubing routing space 24a. The drain passageway 24d enables the tubing routing space 24a to communicate with the drain space 24c. The drain space 24c is provided as a space to receive water drained from the tubing routing space 24a via the drain passageway 24d. The drain space 24c communicates with the exterior of the vehicle compartment (for example, the engine room) via the through hole 70a of the dash panel 70 in such a manner that water is drained from the drain space 24c to the exterior of the vehicle compartment. The tubing routing space 24a and the drain space 24c in the seal compressing portion 24 and the exterior of the vehicle compartment are disposed in a drain path that drains water from the tubing routing space 24a to the exterior of the vehicle compartment in the order, from upstream, of the tubing routing space 24a, the drain space 24c, and the exterior of the vehicle compartment. To facilitate understanding, the drain space 24c and the drain passageway 24d are shaded by using different types of dot in FIG. 4.

Figure 7:
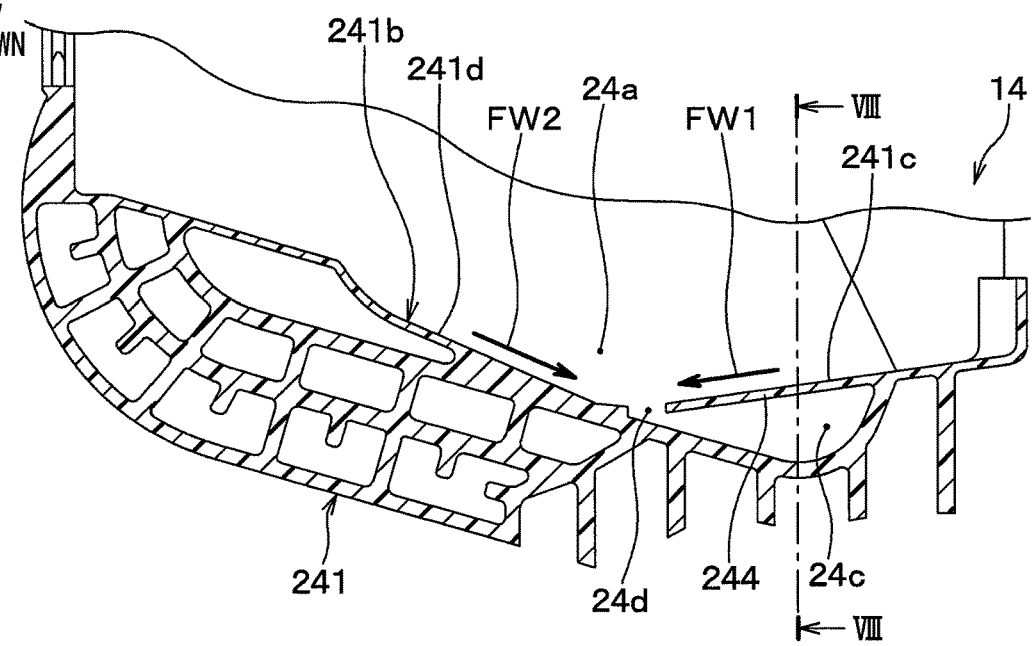
FIG. 7 is a sectional view taken along line VII-VII in FIG. 4, illustrating the air-conditioning case according to the first embodiment in the unassembled state.

Specifically, as illustrated in FIGS. 4 and 7, the lower compressing portion 241 has a bottom surface 241b, or the routing space bottom surface 241b, that faces the tubing routing space 24a from below. The routing space bottom surface 241b includes inclined surfaces 241c and 241d that are inclined with respect to a horizontal plane. The drain passageway 24d has an opening facing the tubing routing space 24a at a position that allows water that has flowed on the inclined surfaces 241c and 241d as indicated by arrows FW1 and FW2 to enter the drain passageway 24d. In other words, the drain passageway 24d has the opening facing the tubing routing space 24a in the routing space bottom surface 241b at a lowest position in the vehicle up and down direction DR1.

Figure 8:
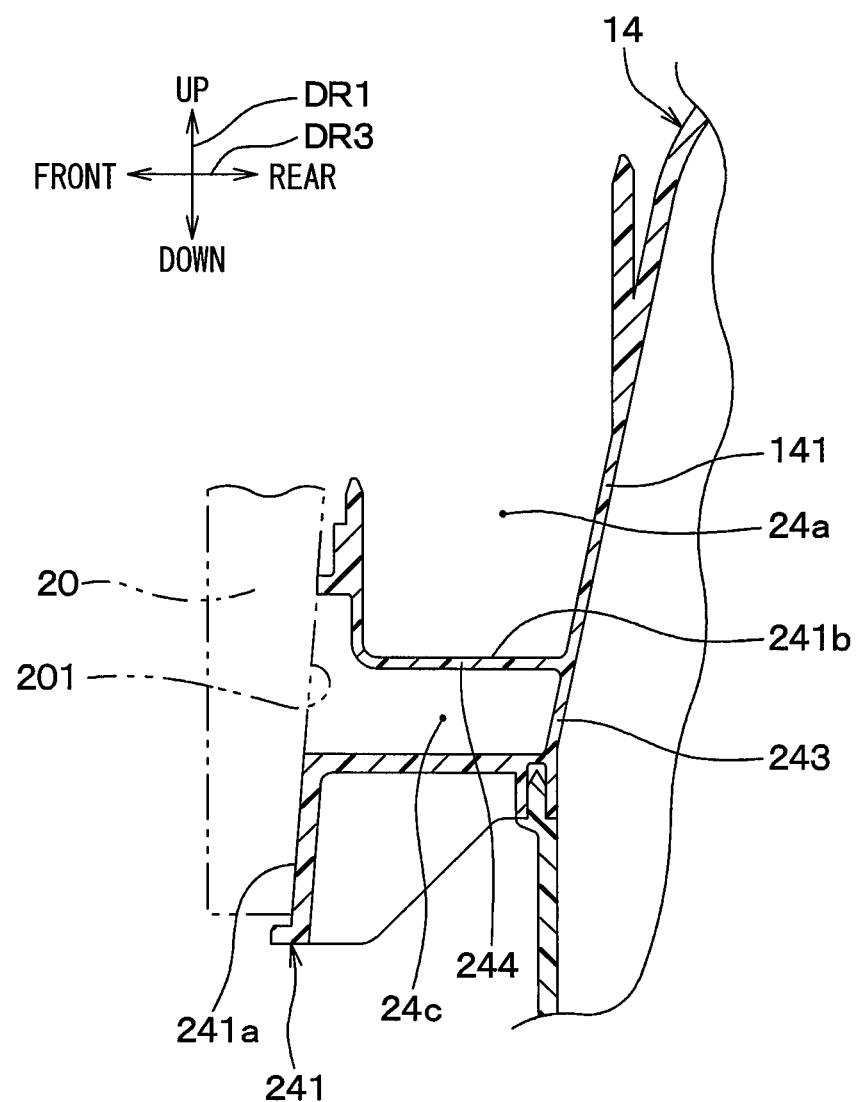
FIG. 8 is a sectional view taken along line VIII-VIII in FIG. 7, illustrating the air-conditioning case according to the first embodiment in the unassembled state.

As illustrated in FIGS. 3 and 8, a side of the drain space 24c in the seal compressing portion 24 opposite the sealing component 20 (that is, toward the rear of the vehicle) is closed. Specifically, the seal compressing portion 24 has a blocking wall 243, which is a portion of the lower compressing portion 241 and blocks the side of the drain space 24c opposite a dash panel 70 side of the drain space 24c.

In contrast, as illustrated in FIGS. 5, 6, and 8, the dash panel 70 side of the drain space 24c in the seal compressing portion 24 (that is, toward the front of the vehicle) is open when the sealing component 20 is not attached. Specifically, the dash panel 70 side of the drain space 24c has an opening in the seal affixing surface 241a of the lower compressing portion 241. The dash panel 70 side of the drain space 24c is thus covered by the sealing component 20 when the sealing component 20 is affixed to the seal compressing portion 24. In other words, the sealing component 20, when attached, configures a wall surface 201 of the drain space 24c on the dash panel 70 side. The wall surface 201 and the sealing component 20 are indicated by a chain double dashed line in FIG. 8. The expansion valve 22 is disposed over the dash panel 70 side of the drain space 24c in the seal compressing portion 24, covering a portion of the drain space 24c in the present embodiment. The dash panel 70 side of the drain space 24c is thus covered not only by the sealing component 20 but also by the expansion valve 22.

A communication passageway 20b is formed in the sealing component 20 to drain water from the drain space 24c of the seal compressing portion 24 to the exterior of the vehicle compartment. The communication passageway 20b enables the drain space 24c to communicate with the exterior of the vehicle compartment in such a manner that water is drained from the drain space 24c to the exterior of the vehicle compartment.

Specifically, the communication passageway 20b is formed like a groove cut downward from the press-in hole 20a of the sealing component 20. The communication passageway 20b has a bottom 20c and is formed in such a manner that the bottom 20c of the communication passageway 20b is positioned lower than the entire drain space 24c of the seal compressing portion 24.

As illustrated in FIGS. 7 and 8, the lower compressing portion 241 of the seal compressing portion 24 has a space dividing portion 244, which is a portion of the lower compressing portion 241. The space dividing portion 244 is formed like a wall and divides the drain space 24c from the tubing routing space 24a vertically. The inclined surface 241c, which is one of the inclined surfaces 241c and 241d included in the routing space bottom surface 241b, is formed as an upper surface of the space dividing portion 244.

The lower compressing portion 241 is formed integrally and includes the space dividing portion 244 in the present embodiment. That is, the space dividing portion 244 is a portion of a molding that is one of the case members, and the molding includes the lower compressing portion 241.

As illustrated in FIGS. 7 and 8, the air-conditioning case 14 according to the present embodiment has an air passageway wall 141 that divides the tubing routing space 24a from the air passageway formed inside the air-conditioning case 14 to allow conditioned air to flow therein. A side of the tubing routing space 24a opposite the dash panel 70 side (that is, toward the rear of the vehicle) is covered by the air passageway wall 141.

As described above and illustrated in FIGS. 2 and 7, the drain space 24c of the seal compressing portion 24 according to the present embodiment receives water drained from the tubing routing space 24a and communicates with the exterior of the vehicle compartment via the through hole 70a of the dash panel 70 in such a manner that water is drained from the drain space 24c to the exterior of the vehicle compartment.

Figure 9:
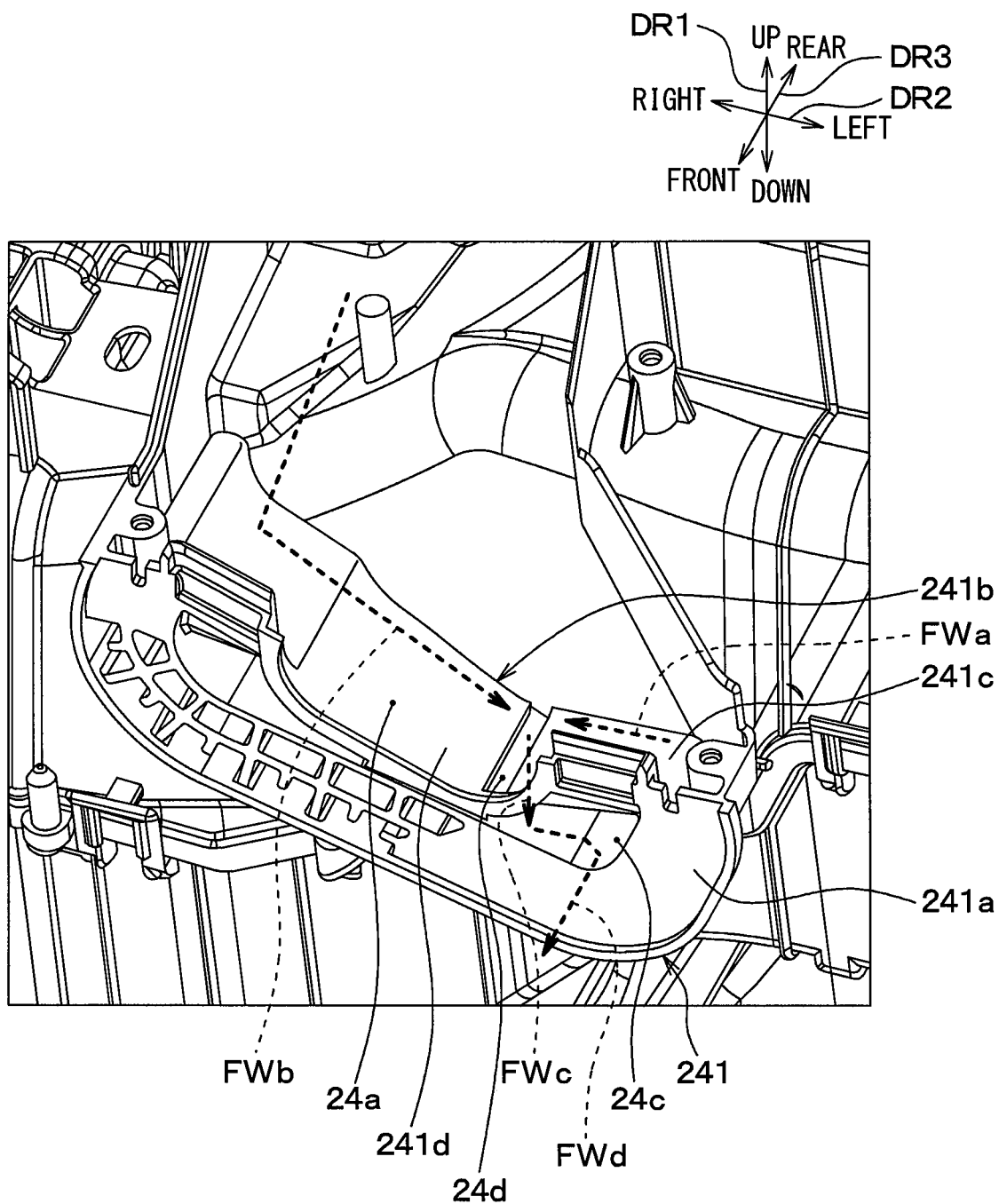
FIG. 9 is a diagram illustrating a drain path that drains water from the tubing routing space of the seal compressing portion to the exterior of the vehicle compartment in the perspective view in FIG. 4.

As illustrated in FIG. 9, for example, water that has entered the tubing routing space 24a and water resulting from condensation on a surface of the inner tubing 12 thus flow on the routing space bottom surface 241b to reach the drain passageway 24d as indicated with arrows FWa and FWb. Water that has entered the drain passageway 24d flows through the drain passageway 24d into the drain space 24c as indicated by an arrow FWc. Water that has entered the drain space 24c is drained to the exterior of the vehicle compartment as indicated by an arrow FWd via the communication passageway 20b of the sealing component 20 (see FIG. 6) and the through hole 70a of the dash panel 70 (see FIG. 12). In other words, the drain path that drains water from the tubing routing space 24a of the seal compressing portion 24 to the exterior of the vehicle compartment can be provided as indicated by the arrows FWa, FWb, FWc, and FWd in FIG. 9.

Additionally, as illustrated in FIGS. 4 and 7, the drain space 24c of the seal compressing portion 24 is disposed below the tubing routing space 24a. The drain path is narrowed at the drain passageway 24d between the tubing routing space 24a and the drain space 24c. Water is thus not likely to flow from the drain space 24c to the tubing routing space 24a. Water can be thus prevented from flowing backward into the tubing routing space 24a through the drain path extending from the tubing routing space 24a to the exterior of the vehicle compartment. For example, water that has entered the drain space 24c from the exterior of the vehicle compartment via the communication passageway 20b of the sealing component 20 (see FIG. 6) is stopped in the drain space 24c and turned back to the exterior of the vehicle compartment as indicated by FWr in FIG. 4.

As described above, the seal compressing portion 24 according to the present embodiment has the function of draining water from the tubing routing space 24a to the exterior of the vehicle compartment and the function of inhibiting water intrusion into the tubing routing space 24a.

As illustrated in FIGS. 4 and 7, the seal compressing portion 24 according to the present embodiment has the routing space bottom surface 241b, which faces the tubing routing space 24a from below. The routing space bottom surface 241b includes the inclined surfaces 241c and 241d, which are inclined with respect to a horizontal plane. Furthermore, the drain passageway 24d, which enables the tubing routing space 24a to communicate with the drain space 24c, is formed in the seal compressing portion 24. The drain passageway 24d has the opening facing the tubing routing space 24a at a position that allows water that has flowed on the inclined surfaces 241c and 241d to enter the drain passageway 24d. In other words, the drain passageway 24d has the opening facing the tubing routing space 24a in the routing space bottom surface 241b at the lowest position in the vehicle up and down direction DR1.

The drain passageway 24d can thus be formed in such a manner that water remaining in the tubing routing space 24a of the seal compressing portion 24 flows into the drain passageway 24d with ease due to gravity.

Additionally, as illustrated in FIGS. 4 and 6, the communication passageway 20b is formed in the sealing component 20 according to the present embodiment. The communication passageway 20b enables the drain space 24c of the seal compressing portion 24 to communicate with the exterior of the vehicle compartment in such a manner that water is drained from the drain space 24c to the exterior of the vehicle compartment. The function of draining water from the drain space 24c to the exterior of the vehicle compartment can thus be provided with the sealing component 20 attached.

The communication passageway 20b of the sealing component 20 according to the present embodiment is formed in such a manner that the bottom 20c of the communication passageway 20b is positioned lower than the entire drain space 24c of the seal compressing portion 24. The sealing component 20 can thus be prevented from obstructing draining of water from the drain space 24c.

Additionally, as illustrated in FIGS. 6 and 8, the sealing component 20 according to the present embodiment configures the wall surface 201 of the drain space 24c on the dash panel 70 (see FIG. 12) side. The dash panel 70 side of the drain space 24c is open when a case member that includes the seal compressing portion 24 is in an unassembled state; thus, the drain space 24c is formed with ease when the case member including the seal compressing portion 24 is manufactured by, for example, injection molding.

Furthermore, as illustrated in FIG. 8, the seal compressing portion 24 according to the present embodiment has the blocking wall 243, which blocks the side of the drain space 24c opposite the dash panel 70 side of the drain space 24c. The blocking wall 243 forces water remaining in the drain space 24c to flow toward the dash panel 70 side of the drain space 24c; thus, the drain space 24c can be formed so as to allow water in the drain space 24c to flow to the exterior of the vehicle compartment.

Moreover, as illustrated in FIG. 9, the tubing routing space 24a and the drain space 24c in the seal compressing portion 24 and the exterior of the vehicle compartment in the present embodiment are disposed in the drain path that drains water from the tubing routing space 24a to the exterior of the vehicle compartment in the order, from upstream, of the tubing routing space 24a, the drain space 24c, and the exterior of the vehicle compartment. Water flowing backward through the drain path can thus be stopped in the drain space 24c before the water reaches the tubing routing space 24a.

Second Embodiment

A second embodiment of the present disclosure is described next. A difference from the first embodiment is mainly described in the present embodiment below. Portions identical with or equivalent to those in the embodiment described above are omitted or described in a simplified manner below. This is also the case in a third embodiment described below.

FIG. 10 is a detail diagram of a seal compressing portion 24 and a nearby area in the present embodiment with a sealing component 20 and an expansion valve 22 omitted; this diagram is equivalent to FIG. 3 in the first embodiment. As indicated by a chain double dashed line in FIG. 10, an extension wall 245 extends downward from an upper compressing portion 242. The extension wall 245 is a portion of a tubing cover 16 and has a planar shape.

As illustrated in FIG. 10, the extension wall 245 covers a dash panel 70 side of a drain space 24c in a lower compressing portion 241. In other words, the extension wall 245 of the tubing cover 16 configures a wall surface 201 of the drain space 24c on the dash panel 70 side.

A sealing component 20 according to the present embodiment is identical with that in the first embodiment. A communication passageway 20b is formed in the sealing component 20 according to the present embodiment. A cutout portion 245a is formed in the extension wall 245 of the tubing cover 16 in such a manner that the position of the cutout portion 245a is aligned with that of the communication passageway 20b so as not to obstruct draining of water from the drain space 24c through the communication passageway 20b to the exterior of the vehicle compartment.

Effects produced by a configuration common with the first embodiment described above can be produced in the present embodiment as in the first embodiment.

Third Embodiment

A third embodiment is described next. A difference from the first embodiment is mainly described in the present embodiment below.

FIG. 11 is a sectional view taken along line VII-VII in FIG. 4, illustrating an air-conditioning case 14 according to the present embodiment in an unassembled state; this diagram is equivalent to FIG. 7 in the first embodiment.

As illustrated in FIG. 11, a space dividing portion 244 according to the present embodiment is disposed in the same position as that in the first embodiment. The space dividing portion 244 according to the present embodiment, however, is configured as a separate piece from a portion of a seal compressing portion 24 other than the space dividing portion 244. In other words, the space dividing portion 244 according to the present embodiment is configured as a separate piece from an air-conditioning case 14. The space dividing portion 244 is secured to the air-conditioning case 14 by, for example, fitting, welding, or the like. The present embodiment is different from the first embodiment in this point.

Effects produced by a configuration common with the first embodiment described above can be produced in the present embodiment as in the first embodiment.

The space dividing portion 244 according to the present embodiment illustrated in FIG. 11 is configured as a separate piece from a portion of the seal compressing portion 24 other than the space dividing portion 244. Constraints imposed on the shape of a drain space 24c in designing the drain space 24c of the seal compressing portion 24 can thus be eased. The drain space 24c can be designed with ease, for example, to have a shape that inhibits water from entering the drain space 24c from the exterior of the vehicle compartment.

While the present embodiment is a modification based on the first embodiment, the present embodiment may be combined with the second embodiment described above.

Other Embodiments (1) As illustrated in FIG. 8, the air-conditioning case 14 according to each of the embodiments described above has the air passageway wall 141, which divides the tubing routing space 24a from the air passageway formed inside the air-conditioning case 14; the side of the tubing routing space 24a toward the rear of the vehicle is covered by the air passageway wall 141. This, however, is presented as an example; the air passageway wall 141 may be eliminated as long as the tubing routing space 24a is formed in such a manner that water that has entered the tubing routing space 24a flows into the drain passageway 24d. For example, if the air passageway wall 141 is eliminated, the side of the tubing routing space 24a toward the rear of the vehicle is open to the air passageway formed inside the air-conditioning case 14.

(2) As illustrated in FIGS. 6 and 8, the dash panel 70 side of the drain space 24c in the seal compressing portion 24 according to the first and third embodiments described above is covered not only by the sealing component 20 but also by the expansion valve 22. This, however, is presented as an example; the dash panel 70 side of the drain space 24c may be covered only by the sealing component 20.

(3) The seal compressing portion 24 according to the first embodiment described above has the lower compressing portion 241 and the upper compressing portion 242. The lower compressing portion 241 is included in the air-conditioning case 14; the upper compressing portion 242 is included in the tubing cover 16. In other words, the seal compressing portion 24 is configured using a plurality of pieces. This, however, is presented as an example; the seal compressing portion 24 may be configured using a single piece. The seal compressing portion 24 may be configured as a separate piece from the air-conditioning case 14 and the tubing cover 16. This is also the case in the second and third embodiments.

(4) While the expansion valve 22 according to each of the embodiments described above serves also as a tubing coupler that is coupled to the tubing 952 located in the exterior of the vehicle compartment (see FIG. 12), a component other than the expansion valve 22 may serve as the tubing coupler.

The present disclosure is not limited to the embodiments described above. The present disclosure includes various modifications and equivalent modifications. The embodiments described above are not unrelated to each other and can be combined as appropriate except when it is apparent that they cannot be combined. It is needless to say that any one of components that configure each of the embodiments is not necessarily essential unless otherwise noted in the embodiment expressly or unless a principle apparently requires it.

The numbers of components that configure each of the embodiments, a numerical value, an amount, a range or other numerical values, if stated, is not a limitation unless it is noted as essential in the embodiment expressly or unless a principle apparently requires it. A material, shape, positional relationship, or the like of any component, if stated, is not a limitation unless otherwise noted in the embodiment expressly or unless a principle apparently requires it.

CONCLUSION

In a first aspect illustrated in part or in whole in each of the embodiments described above, the seal compressing portion includes a tubing routing space configured to allow the inner tubing to extend therethrough, and a drain space positioned below the tubing routing space and configured to receive water drained from the tubing routing space. The drain space is configured to communicate with the exterior of the vehicle compartment via the through hole in such a manner that water is discharged from the drain space to the exterior of the vehicle compartment.

In a second aspect, the seal compressing portion has a bottom surface that faces the tubing routing space from below. The bottom surface includes an inclined surface that is inclined with respect to a horizontal plane. The seal compressing portion includes a drain passageway through which the tubing routing space communicates with the drain space. The drain passageway has an opening facing the tubing routing space at a position where water that has flowed down on the inclined surface enters the drain passageway. The drain passageway can thus be formed in such a manner that water remaining in the tubing routing space flows into the drain passageway with ease due to gravity.

In a third aspect, the seal compressing portion has a bottom surface that faces the tubing routing space from below. The seal compressing portion includes a drain passageway through which the tubing routing space communicates with the drain space. The drain passageway has an opening facing the tubing routing space at a lowest position in the bottom surface in an up and down direction. The drain passageway can thus be formed in such a manner that water remaining in the tubing routing space flows into the drain passageway with ease due to gravity.

In a fourth aspect, the sealing component includes a communication passageway through which the drain space communicates with the exterior of the vehicle compartment in such a manner that water is discharged from the drain space to the exterior of the vehicle compartment. The function of draining water from the drain space to the exterior of the vehicle compartment can thus be provided with the sealing component attached.

In a fifth aspect, the communication passageway is formed in such a manner that a bottom of the communication passageway is positioned lower than any part of the drain space. The sealing component can thus be prevented from obstructing draining of water from the drain space.

In a sixth aspect, the sealing component constitutes a wall surface of the drain space behind which the partition wall exists. A side of the drain space facing the partition wall is open when a member that includes the seal compressing portion is in an unassembled state; thus, the drain space is formed with ease when the member including the seal compressing portion is manufactured.

In a seventh aspect, the seal compressing portion has a blocking wall that closes a side of the drain space facing away from the partition wall. The blocking wall forces water remaining in the drain space to flow toward the partition wall in the drain space; thus, the drain space can be formed so as to allow the water in the drain space to flow to the exterior of the vehicle compartment.

In an eighth aspect, the seal compressing portion has a space dividing portion that divides the drain space from the tubing routing space. The space dividing portion is configured as a part which is separate from parts of the seal compressing portion other than the space dividing portion. Constraints imposed on the shape of the drain space in designing the drain space can thus be eased. The drain space can be designed, for example, to have a shape that inhibits water from entering the drain space from the exterior of the vehicle compartment.

In a ninth aspect, the tubing routing space, the drain space, and the exterior of the vehicle compartment are arranged in an order from upstream: the tubing routing space; the drain space; and the exterior of the vehicle compartment, in a drain path through which water is discharged from the tubing routing space to the exterior of the vehicle compartment. Water flowing backward through the drain path can thus be blocked in the drain space before the water reaches the tubing routing space.

What is claimed is:

1. A vehicle air-conditioning unit to be placed in an interior of a vehicle compartment, the interior of the vehicle compartment communicating with an exterior of the vehicle compartment through a through hole of a partition wall, the vehicle air-conditioning unit comprising:
   a tubing coupler configured to be a part of a tubing module extending through the through hole, the tubing coupler being configured to be coupled to outer tubing, the outer tubing being included in the tubing module and located in the exterior of the vehicle compartment;
   inner tubing located in the interior of the vehicle compartment, configured to be included in the tubing module and configured to be coupled via the tubing coupler to the outer tubing located in the exterior of the vehicle compartment;
   a sealing material located in the interior of the vehicle compartment and surrounding the tubing coupler; and
   a seal compressing portion located in the interior of the vehicle compartment and configured to be disposed to face a through-hole surrounding portion across the sealing material, the through-hole surrounding portion constituting a periphery of the through hole of the partition wall, the sealing material being configured to be compressed between the seal compressing portion and the through-hole surrounding portion,
   wherein:
   the seal compressing portion includes a tubing routing space configured to allow the inner tubing to extend therethrough, and a drain space positioned below the tubing routing space and configured to receive water drained from the tubing routing space;
   the drain space is configured to communicate with the exterior of the vehicle compartment via the through hole in such a manner that water is discharged from the drain space to the exterior of the vehicle compartment;
   the sealing material includes a communication passageway through which the drain space communicates with the exterior of the vehicle compartment in such a manner that water is discharged from the drain space to the exterior of the vehicle compartment; and
   the communication passageway is formed in such a manner that a bottom of the communication passageway is positioned lower than any part of the drain space.

2. The vehicle air-conditioning unit according to claim 1, wherein:
   the seal compressing portion has a bottom surface that faces the tubing routing space from below;
   the bottom surface includes an inclined surface that is inclined with respect to a horizontal plane;
   the seal compressing portion includes a drain passageway through which the tubing routing space communicates with the drain space; and
   the drain passageway has an opening facing the tubing routing space at a position where water that has flowed down on the inclined surface enters the drain passageway.

3. The vehicle air-conditioning unit according to claim 1, wherein:
   the seal compressing portion has a bottom surface that faces the tubing routing space from below;
   the seal compressing portion includes a drain passageway through which the tubing routing space communicates with the drain space; and
   the drain passageway has an opening facing the tubing routing space at a lowest position in the bottom surface in an up and down direction.

4. The vehicle air-conditioning unit according to claim 1, wherein the sealing material constitutes a wall surface of the drain space behind which the partition wall exists.

5. The vehicle air-conditioning unit according to claim 1, wherein the seal compressing portion has a blocking wall that closes a side of the drain space facing away from the partition wall.

6. The vehicle air-conditioning unit according to claim 1, wherein:
   the seal compressing portion has a space dividing portion that divides the drain space from the tubing routing space; and
   the space dividing portion is configured as a part which is separate from parts of the seal compressing portion other than the space dividing portion.

7. The vehicle air-conditioning unit according to claim 1, wherein the tubing routing space, the drain space, and the exterior of the vehicle compartment are arranged in an order from upstream: the tubing routing space; the drain space; and the exterior of the vehicle compartment, in a drain path through which water is discharged from the tubing routing space to the exterior of the vehicle compartment.

8. A vehicle air-conditioning unit comprising:
   a tubing coupler configured to couple inner tubing positioned in an interior of a vehicle compartment and outer tubing positioned in an exterior of the vehicle compartment in a vehicle, the tubing coupler, the inner tubing and the outer tubing being configured to constitute a tubing module extending through a through hole of a partition wall that separates the interior and the exterior of the vehicle compartment;
   a sealing material located in the interior of the vehicle compartment and surrounding the tubing coupler; and
   a seal compressing portion disposed next to the sealing material in the interior of the vehicle compartment and configured to press the sealing material against the partition wall, wherein
   the seal compressing portion includes a tubing routing space configured to allow the inner tubing to extend therethrough, and a drain space positioned below the tubing routing space to receive water drained from the tubing routing space and configured to communicate with the external of the vehicle compartment through the through hole of the partition wall to discharge the water to the exterior of the vehicle compartment.

* * * * *